United States Patent [19]
Schmed

[11] Patent Number: 5,722,313
[45] Date of Patent: Mar. 3, 1998

[54] MACHINE FOR MAKING BEVERAGES SUCH AS ESPRESSO COFFEE WITH AUTOMATIC GROUND COFFEE INTRODUCTION AND DREGS EXPULSION

[75] Inventor: Arthur-Joachim Schmed, Oberdürnten, Switzerland

[73] Assignee: J. Lough Limited, Ireland

[21] Appl. No.: 690,212

[22] Filed: Jul. 26, 1996

[30] Foreign Application Priority Data

Jul. 31, 1995 [CH] Switzerland ............ 02231/95

[51] Int. Cl.⁶ .................................. A47J 31/34
[52] U.S. Cl. ........................ 99/289 R; 99/302 P
[58] Field of Search .................... 99/289 R, 302 P, 99/287

[56] References Cited

U.S. PATENT DOCUMENTS

| | | |
|---|---|---|
| 3,221,857 | 12/1965 | Small et al. |
| 4,271,752 | 6/1981 | Valente et al. ............ 99/289 R |
| 5,255,594 | 10/1993 | Grossi .................. 99/289 R X |
| 5,259,296 | 11/1993 | Mikael et al. ........... 99/289 R X |
| 5,492,054 | 2/1996 | Schneeberger ............. 99/289 R |

FOREIGN PATENT DOCUMENTS

| | | |
|---|---|---|
| 3 105 124 | 8/1982 | Germany. |
| 4 329 597 | 12/1994 | Germany. |
| 2 019 202 | 10/1979 | United Kingdom. |
| 2 159 392 | 12/1985 | United Kingdom. |
| 9 319 655 | 10/1993 | WIPO. |

*Primary Examiner*—Reginald L. Alexander
*Attorney, Agent, or Firm*—Dressler, Rockey, Milnamow & Katz, Ltd.

[57] ABSTRACT

A machine for making a beverage such as espresso coffee, with automatic ground coffee introduction and dregs expulsion, having a main shaft that drives, synchronously and simultaneously, through sector-shaped gears and cams controlled thereby, the movement of a ground coffee dosage and feeding device, of a used dregs expulsion unit, of a unit that forms the extraction chamber, and, through a lever, of a plunger that forms the bottom of the extraction chamber and furthermore moves, directly or indirectly, all the other elements required for operation.

24 Claims, 11 Drawing Sheets

MACHINE FOR MAKING BEVERAGES SUCH AS ESPRESSO COFFEE WITH AUTOMATIC GROUND COFFEE INTRODUCTION AND DREGS EXPULSION

BACKGROUND OF THE INVENTION

The present invention relates to a machine for producing beverages such as espresso coffee with automatic ground coffee introduction and dregs expulsion.

It is known that so-called automatic or superautomatic machines for making coffee-based beverages, such as espresso coffee, are already commercially available which perform, with an automatic cycle, all the operations related to the making of espresso coffee, such as introducing the ground coffee in the extraction chamber, forming the solution, and then expelling the used coffee dregs.

These machines generally achieve a beverage quality level that increases in proportion to their mechanical complexity and assortment of technical contrivances. As a consequence thereof, said machines are necessarily and undesirably expensive, bulky, and technically complicated, and therefore adapted for professional use, but scarcely adapted for home use.

Furthermore, in order to achieve a high beverage quality level, the degree of grinding of the coffee has been so far one of the worst problems to solve, since it must be contained within very narrow limits that depend on the type of coffee being used, the degree of humidity, the pressing of the ground coffee, the operating temperature, and the freshness of the coffee.

This has led to the need, so far, to use a manually-adjusted mill that is electronically associated with the machine, in order to allow, through the adjustment of the degree of grinding, to tune said parameters whenever necessary.

In conventional automatic and superautomatic machines, it is necessary to use electric motors that perform all the operating cycles in a preset sequence, therefore with the need for a considerable addition of electronic componentry for machine management that significantly affects the constructive complexity of the machine and its costs.

SUMMARY OF THE INVENTION

A principal aim of the present invention is to eliminate the drawbacks mentioned above by providing a machine for making beverages such as espresso coffee with automatic ground coffee introduction and dregs expulsion, which can operate even without a motorization system, without a mill, and without the associated electronic parts.

Another object of the invention is to minimize the operating efforts and to distribute them as uniformly as possible throughout handling, so as to also allow optional manual actuation. The invention, as shown in this non-limitative embodiment, allows to perform the necessary operating sequence by means of mechanical elements interacting with one another. A particularity of the invention is that it can operate with a wide range of grindings and that therefore it is possible to eliminate the use of the built-in mill, as in the invention shown herein in a preferred but non-limitative embodiment.

Within the scope of this aim, a particular object of the invention is to provide a machine for making beverages such as espresso coffee that achieves a considerable constructive simplification which however does not detract from the quality of the beverage that is obtained.

Another object of the present invention is to provide a machine wherein the sequence of movements can be performed simply and with the assurance of always having maximum reliability.

Another object of the present invention is to provide a machine that can be easily obtained starting from commonly commercially available elements and materials and is furthermore particularly competitive from a purely economical point of view.

This aim, these objects, and others which will become apparent hereinafter are achieved by a machine for making beverages such as espresso coffee, with automatic ground coffee introduction and dregs expulsion, according to the invention, characterized in that it comprises an actuation unit for actuating a main shaft that drives a ground coffee dosage device and a cam-based actuation unit that interacts with a ground coffee feeding and expulsion unit, with the block that forms the extraction chamber, and with the actuation lever of the infusion piston for their synchronized movement.

BRIEF DESCRIPTION OF THE DRAWINGS

Further characteristics and advantages will become apparent from the following detailed description of a preferred but not exclusive embodiment of a machine for making beverages such as espresso coffee, with automatic ground coffee introduction and dregs expulsion, illustrated only by way of non-limitative example in the accompanying drawings, wherein.

DESCRIPTION OF THE PREFERRED EMBODIMENTS

With reference to the above figures, the machine for making infusions such as espresso coffee, with automatic ground coffee introduction and dregs expulsion, according to the invention, comprises a supporting structure that is generally designated by the reference numeral 1 and whereon an actuation unit 2 for the actuation of a main shaft 3 is located.

The actuation unit can be of the manual type and therefore comprises an actuation crank 10 connected to a first gear 11, which meshes with a second gear 12, which has a greater number of teeth than the first gear 11 and is keyed on the main shaft 3 so as to make it rotate. It is of course possible to provide for a motorization system that performs the movements that can be obtained with the crank.

A transmission pin wheel 13 is provided on the main shaft 3 and meshes with a pin wheel 14 having a substantially vertical axis and actuating the mixer 15 of a dosage device 16, in which the ground coffee to be used to produce the extract is placed.

An important particularity of the invention resides in the fact that a cam-based actuation unit, generally designated by the reference numeral 20, is located on the main shaft 3 and in practice controls all the functions of the machine, allowing to perform the various operating steps in succession.

The cam-and-gear actuation unit 20 interacts with a ground coffee feeding and expulsion unit, with the block that forms the extraction chamber, and with the actuation lever of the infusion plunger to achieve synchronized movement.

Figures 5, 6, 7:
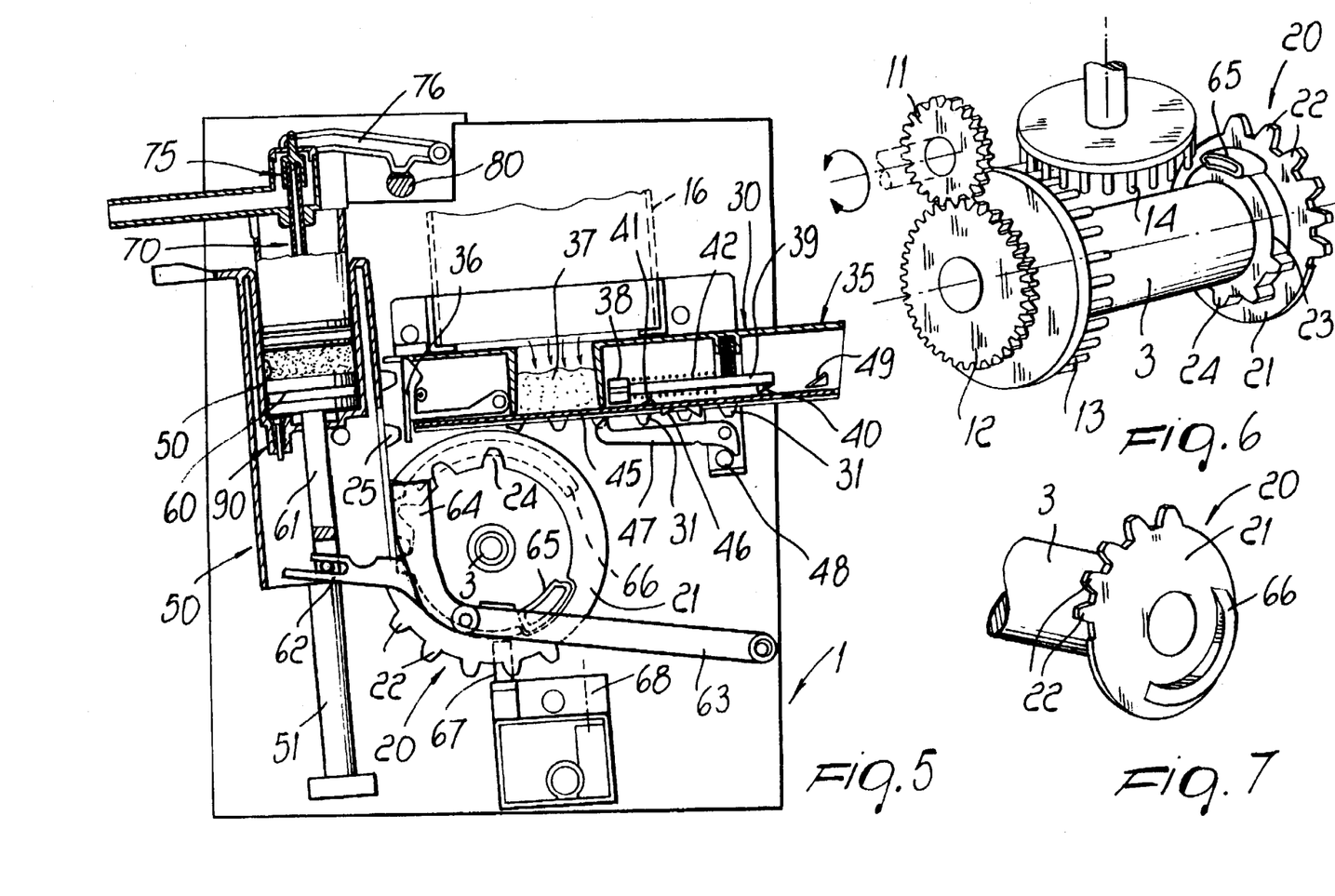
FIG. 5 is a partially sectional elevation view of the pressing of the coffee pellet and of the preparation for dispensing espresso coffee.
FIG. 6 is a schematic perspective view of the detail of the kinematic couplings on the main shaft.
FIG. 7 is a view of the cam-based actuation unit, taken from the opposite side with respect to FIG. 6.
Figure 8:
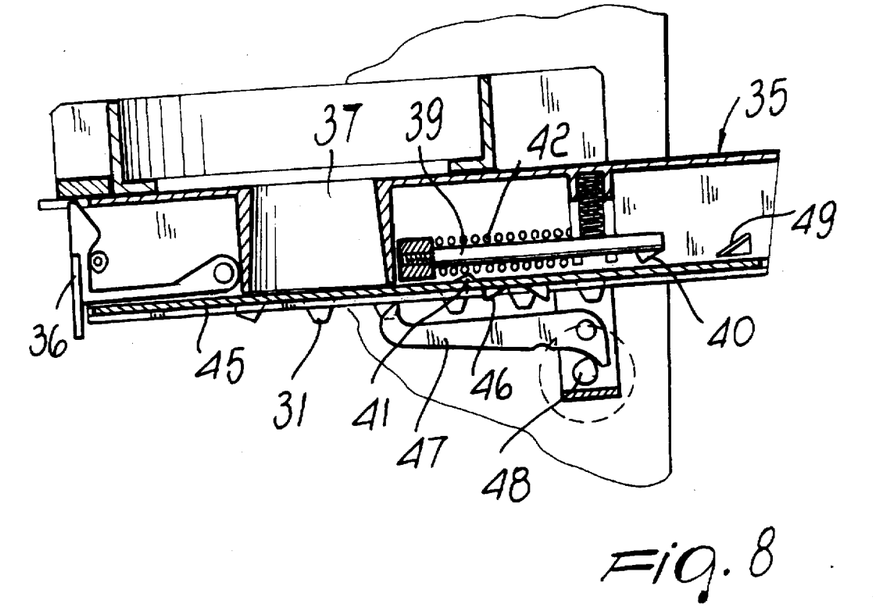
FIG. 8 is a sectional view of the ground coffee feeding and expulsion unit, arranged in the condition in which it does not allow ground coffee dispensing.
Figure 9:
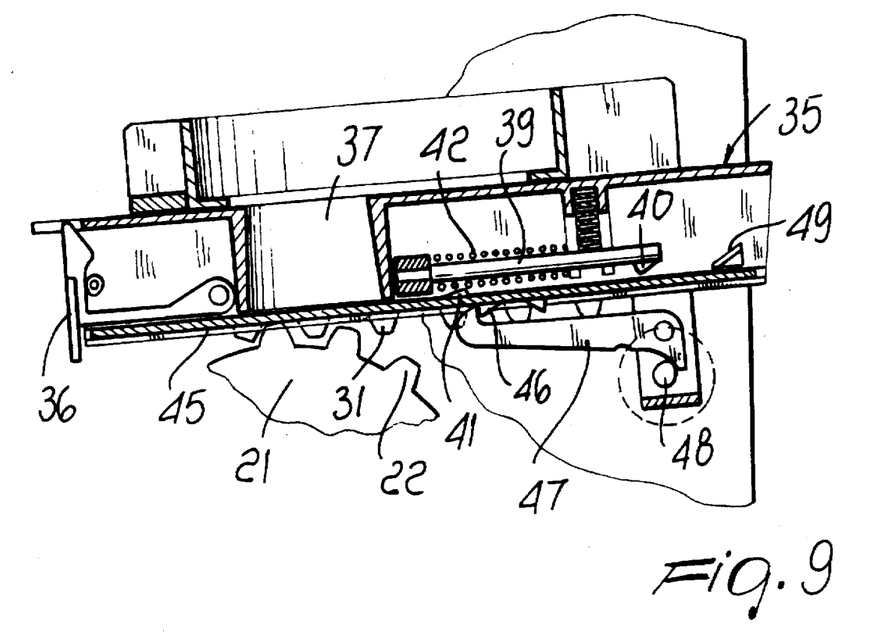
FIG. 9 is a sectional view of the ground coffee feeding and expulsion unit, preset for dispensing the ground coffee.

The cam-and-gear actuation unit 20, which is shown more clearly in FIGS. 6 and 7, is provided with a substantially circular plate-like element 21 having a toothed portion 22 for the actuation of a ground coffee feeding and expulsion unit, generally designated by the reference numeral 30.

The toothed portion 22 interacts with a rack-like set of teeth 31 formed in the lower part of the feeding and expulsion unit 30, which is slideable below the dosage device 16.

The feeding and expulsion unit 30 has an elongated body 35 ending, at the front, with a pusher 36 that has the purpose, as will become apparent hereinafter, of removing the pellet of used coffee dregs.

The feeding unit 30 forms a coffee introduction chamber 37 that can be arranged below the dosage device 16 for the introduction of a measured amount of coffee by means of the mixer 15.

To the side of the introduction chamber 37 there is provided a hammer 38 provided with a stem 39 that ends with a tooth 40 which, during the translatory motion of the body 35, engages an abutment of the hammer 41 so as to load the spring 42 that is arranged around the stem 39.

Below the introduction chamber 37, and so as to removably close it, there is provided a gate 45 slideable for engagement between a tooth 46 formed by the gate and a pawl 47 that engages the tooth 46 to produce the sliding of the gate with respect to the body 35, with consequent opening of the coffee introduction chamber 37.

The gate pawl 47 is actuated by a gate cam 48 that allows to disengage the pawl from the tooth 46 when one does not wish to introduce the dose of coffee in the infusion chamber, as will become apparent hereinafter.

Figures 10, 11:
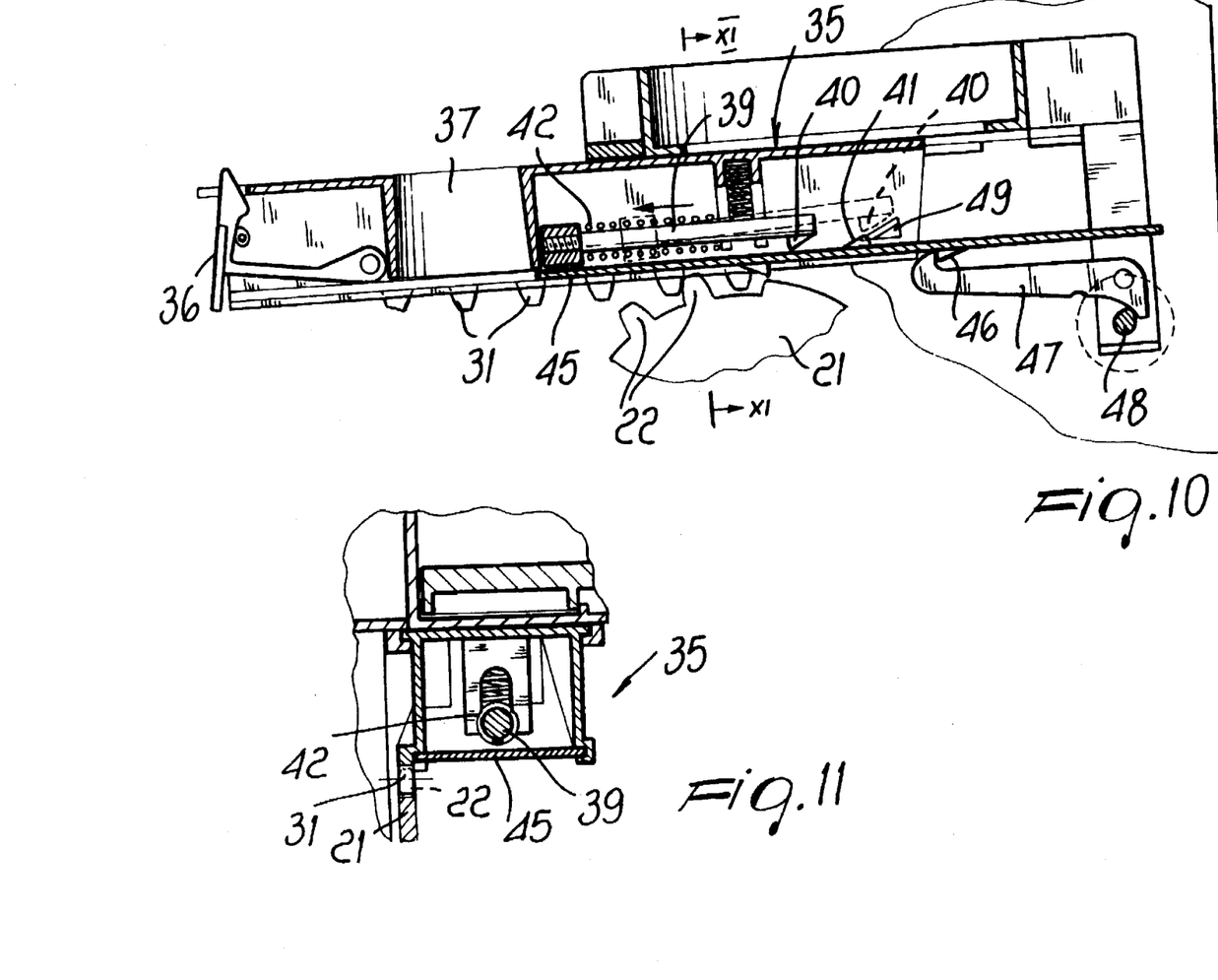
FIG. 10 is a view of the ground coffee feeding and expulsion unit during the dispensing of the ground coffee to the extraction chamber.
FIG. 11 is a sectional view, taken along the plane XI—XI of FIG. 10.
Figure 12:
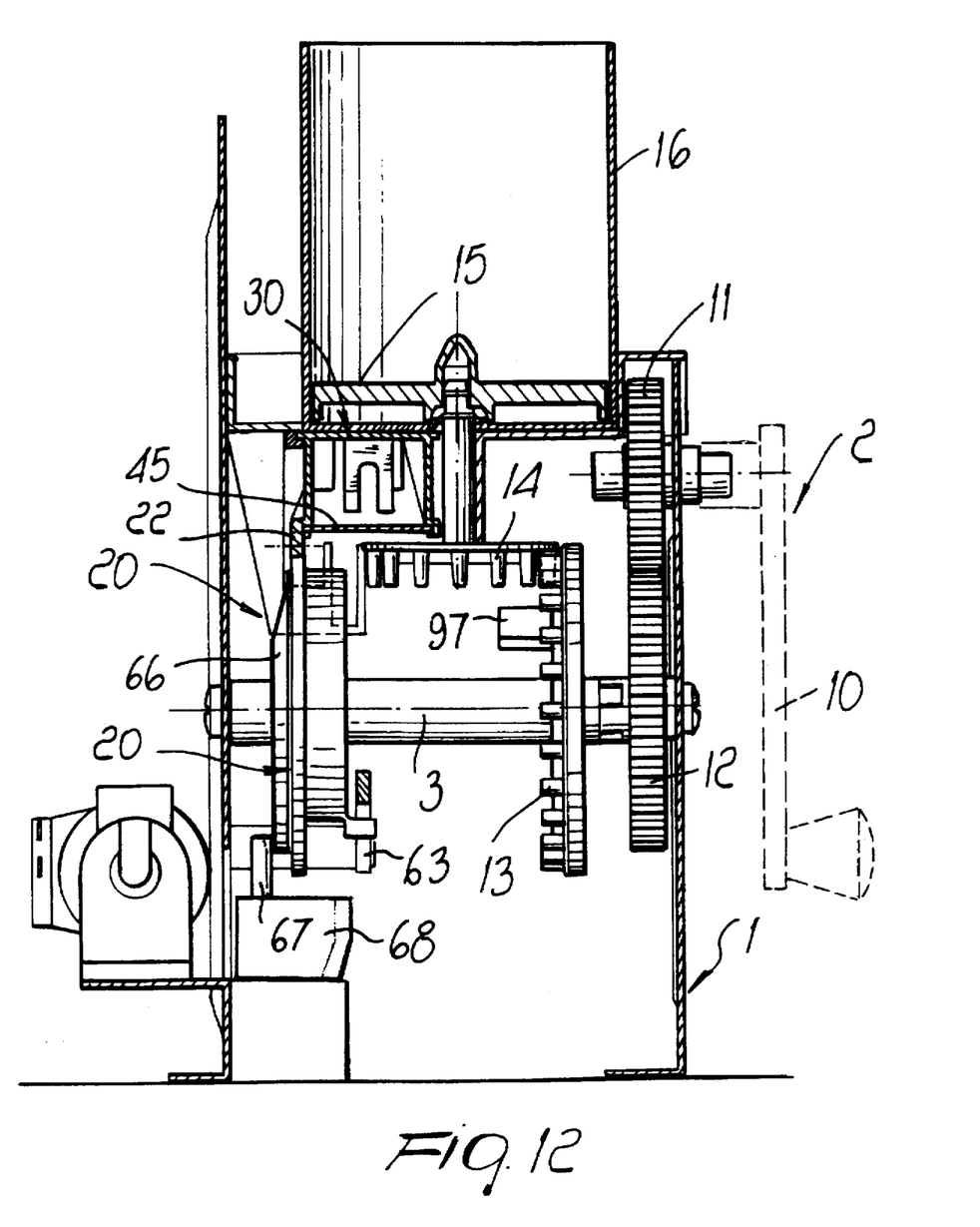
FIG. 12 is a partially sectional front elevation view of the machine, illustrating the mechanical couplings for actuation.
Figure 13:
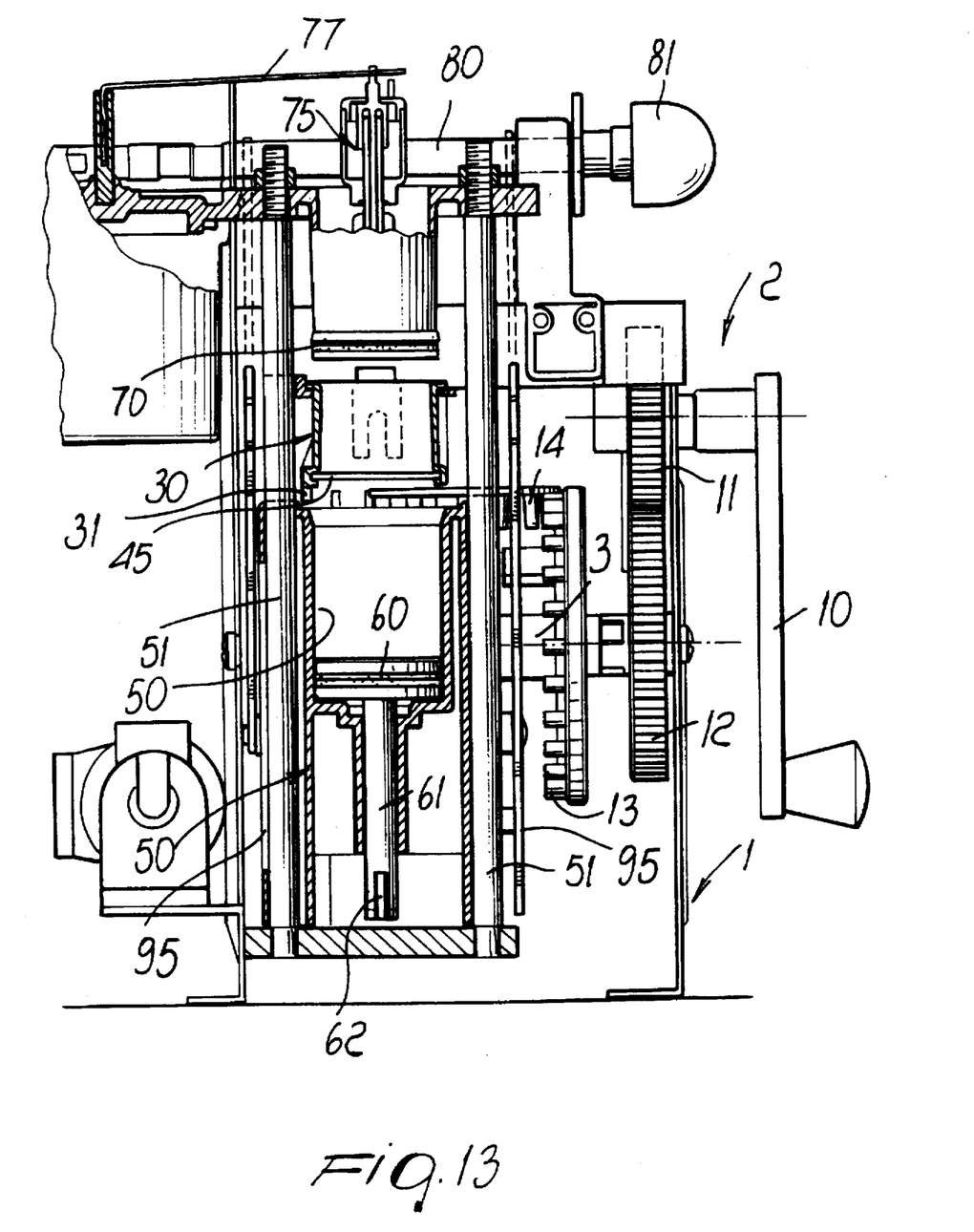
FIG. 13 is a sectional elevation view of the machine, taken at the extraction chamber.

During the translatory motion of the elongated body as shown in FIG. 10, the gate begins to open when the chamber 37 is arranged above the extraction chamber, which will be described hereinafter.

Furthermore, in order to allow full dispensing of the ground coffee, the hammer 38 is removably retained by the abutment 41, loading the spring 42 until a release element 49 acts on the end of the stem of the hammer, disengaging the tooth 40 from the abutment 41, consequently causing the impact against the coffee introduction chamber and the full dispensing of the coffee.

The rotation of the cam unit 20, in addition to producing the movement of the feeding and expulsion unit 30, also causes the movement of the extraction chamber, generally designated by the reference numeral 50, by virtue of the presence of a sector 23 arranged laterally adjacent to the plate 21 and provided with a set of teeth for the translatory motion of the extraction chamber 24; said set of teeth engages a rack-like set of teeth for the translatory motion of the extraction chamber 25, which is formed on the body of the extraction chamber, which can slide since it is guided by two guiding columns, designated by the reference numeral 51.

An infusion plunger 60 can slide hermetically with respect to the inside of the extraction chamber 50; its stem 61 protrudes downwards from the extraction chamber 50 and engages the fork-like end 62 of an infusion plunger actuation lever 63, which has a folded end 64 that can engage an infusion plunger retraction cam 65 formed on the portion 23 of the cam-based unit 20, in a point that is offset with respect to the set of teeth.

A sector-shaped cam 66 is provided on the cam-based unit 20, on the opposite face of the plate-like element 21 provided with the portion 23, and engages a pin 67 that actuates a secondary lever 68 arranged below the lever 63 to prevent its movement when the plunger is in the raised position.

Figure 15:
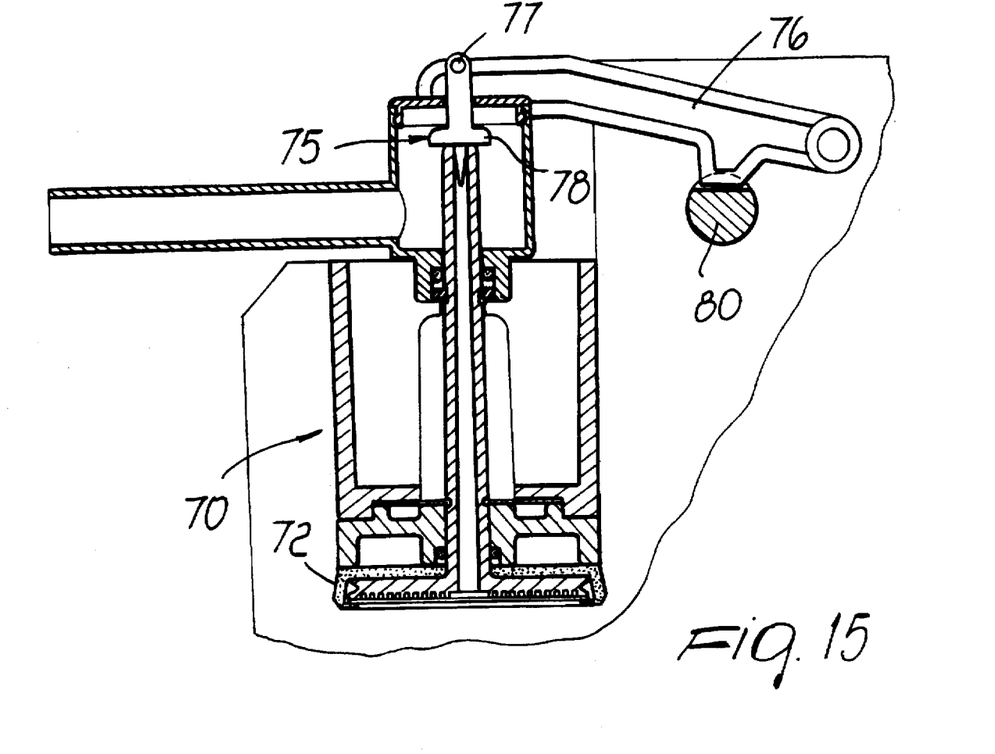
FIG. 15 is a sectional view of the complementary dispensing plunger, illustrating the dispensing counterpressure valves.

Above the extraction chamber there is provided a fixed complementary plunger, designated by the reference numeral 70, that has the function of compacting the coffee pellet and of forming the extraction chamber. The complementary plunger 70 forms the coffee extract dispensing duct 71, which is controlled by a dispensing counterpressure valve, designated by the reference numeral 75 in FIG. 15, that is controlled by a dispensing lever 76 acting on a rod 77, which presses on the conical pin 78 of the dispensing valve.

The lever 76 can be actuated by a contoured portion of a secondary actuation shaft, designated by the reference numeral 80, and is provided with a grip knob 81; the secondary shaft 80 has the purpose of synchronizing the engagement of the valve with the dispensing action of the pump and therefore with the dispensing of the coffee.

The complementary plunger 70 is provided with a sealing gasket 72 that hermetically engages the extraction chamber and has a particular shape that assuredly prevents infiltrations of ground coffee. The execution of the gasket 72 is particularly important, since it allows a very low sliding friction and high resistance to clogging by ground coffee, allowing sliding with the limited applied forces that can be achieved by manual actuation.

Furthermore, below the extraction chamber there is provided a venting valve, generally designated by the reference numeral 90, having a stem 91 that interacts with the tab 62a of the fork, so as to connect the extraction chamber to the discharge when it is necessary to perform the retracting descent of the infusion plunger.

Figure 17:
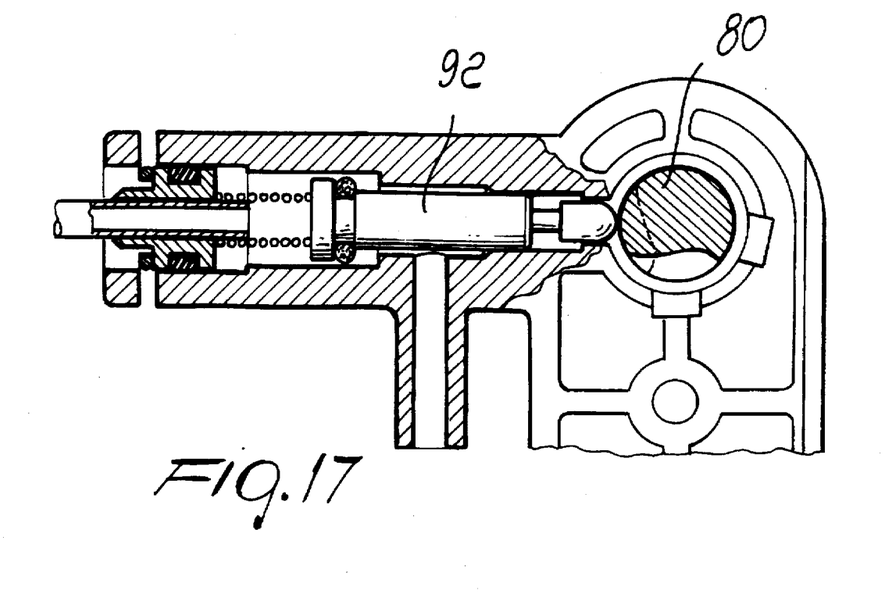
FIG. 17 is a sectional view of the discharge valve.

A similar discharge valve, shown in FIG. 17 and designated by the reference numeral 92, is provided at the dispensing region and has the purpose of opening, under the actuation of a cam by means of the secondary shaft 80 to allow the venting of pressure for correct movement during the opening of the chamber.

Moreover, there is provided a locking lever, designated by the reference numeral 95, that is pivoted to the extraction chamber 50 and closes on a set of teeth 96 formed on the side of the complementary plunger and having the purpose of keeping the extraction chamber closed on the complementary plunger during the dispensing of the coffee.

Figure 14:
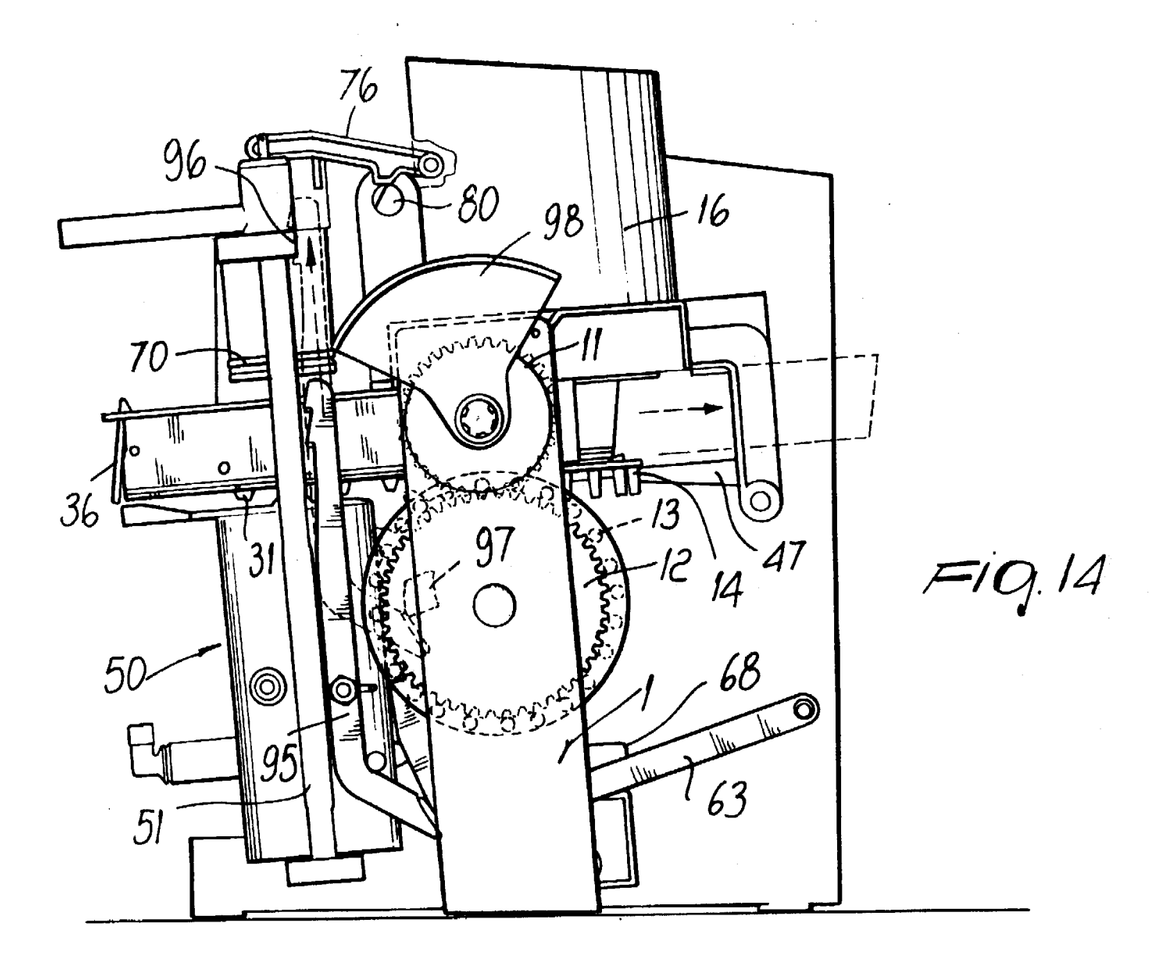
FIG. 14 is a lateral elevation view of the machine, illustrating the step for closing the extraction chamber to perform coffee dispensing.

Said lever, which is shown in FIG. 14, is actuated by a cam 97 of the closure lever that is arranged on the main shaft 3 and has the purpose of opening the lever for optional actuation after the end of the dispensing step.

Substantially, the secondary shaft 80, which can be actuated manually, allows to engage the counterpressure valve 75 downstream of the extraction chamber and to synchronize the engagement of said valve with respect to pump feeding, by means of a cam acting on a lever that actuates, so as to release it, a spring element and by means of a cam acting on a switch. The shaft furthermore synchronizes, by means of another cam acting on a switch, the engagement of the pump and controls the opening of a faucet for drawing hot water.

The secondary shaft 80, turned into another position, synchronizes the engagement of the resistor of the boiler and the opening of said faucet by means of a cam acting on a switch to produce steam. The faucet is coupled to an external knob that allows to select the desired function according to the selected position.

There is also provided a sector 98 that allows to visualize the various positions of the lever to allow the cyclic operating sequence.

The operating sequence is very simple.

During the initial step, starting from the completed dispensing of a coffee (FIG. 5), by turning the lever 10 in one direction, first of all the extraction chamber is shifted downwards, after releasing the closure lever that held it connected to the complementary plunger 70.

Figure 1:
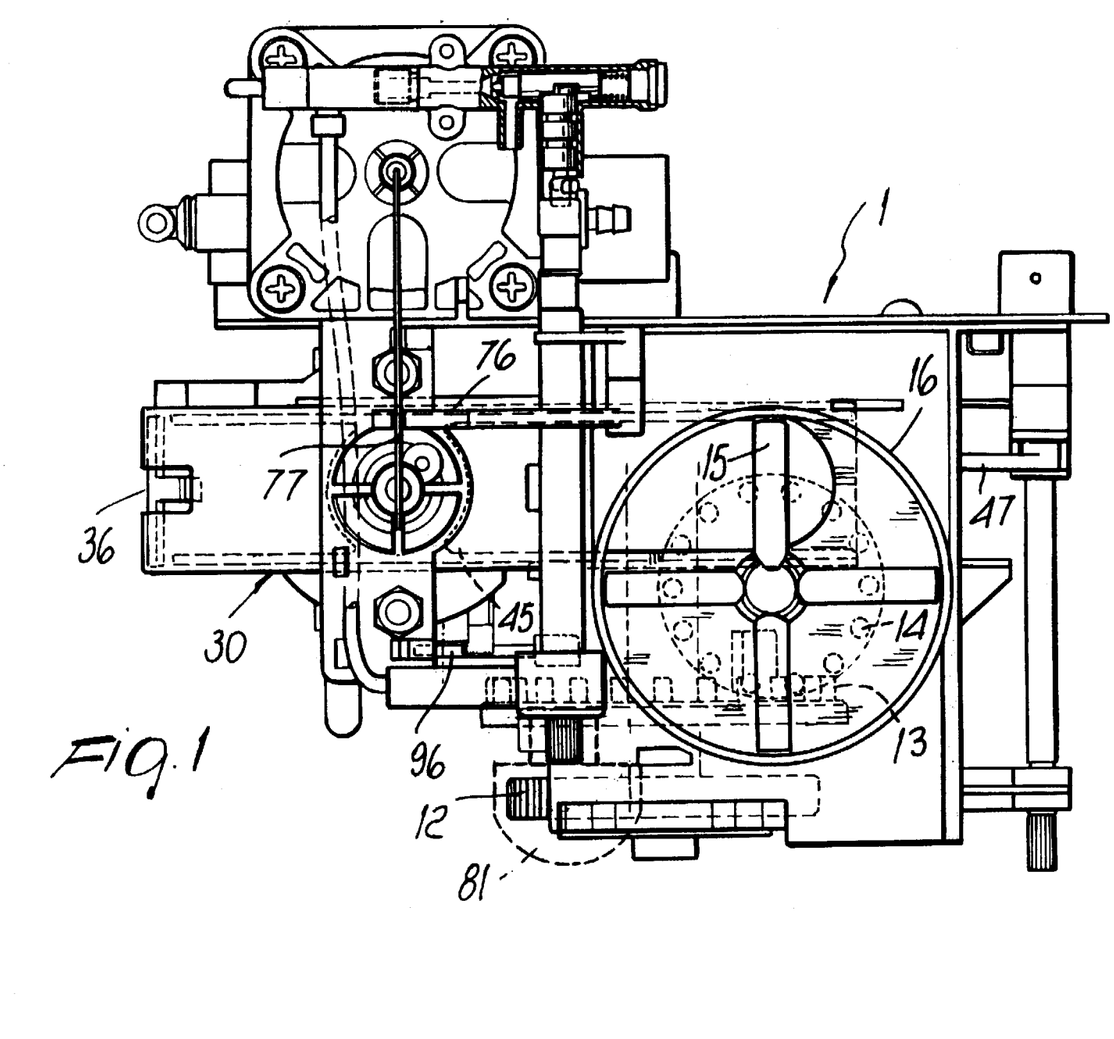
FIG. 1 is a schematic plan view of the mechanisms constituting the machine according to the invention.
Figure 2:
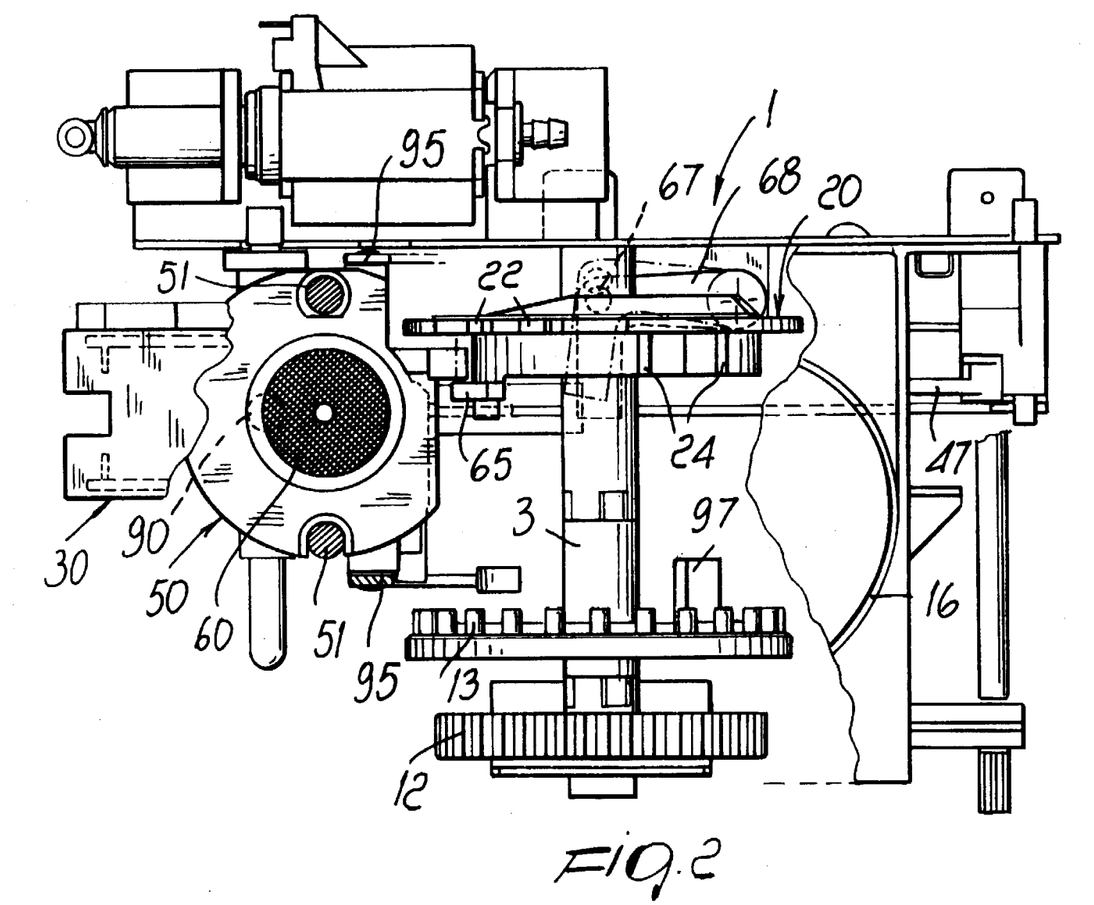
FIG. 2 is a top plan view of the mechanisms, illustrating the main shaft.
Figures 3, 16:
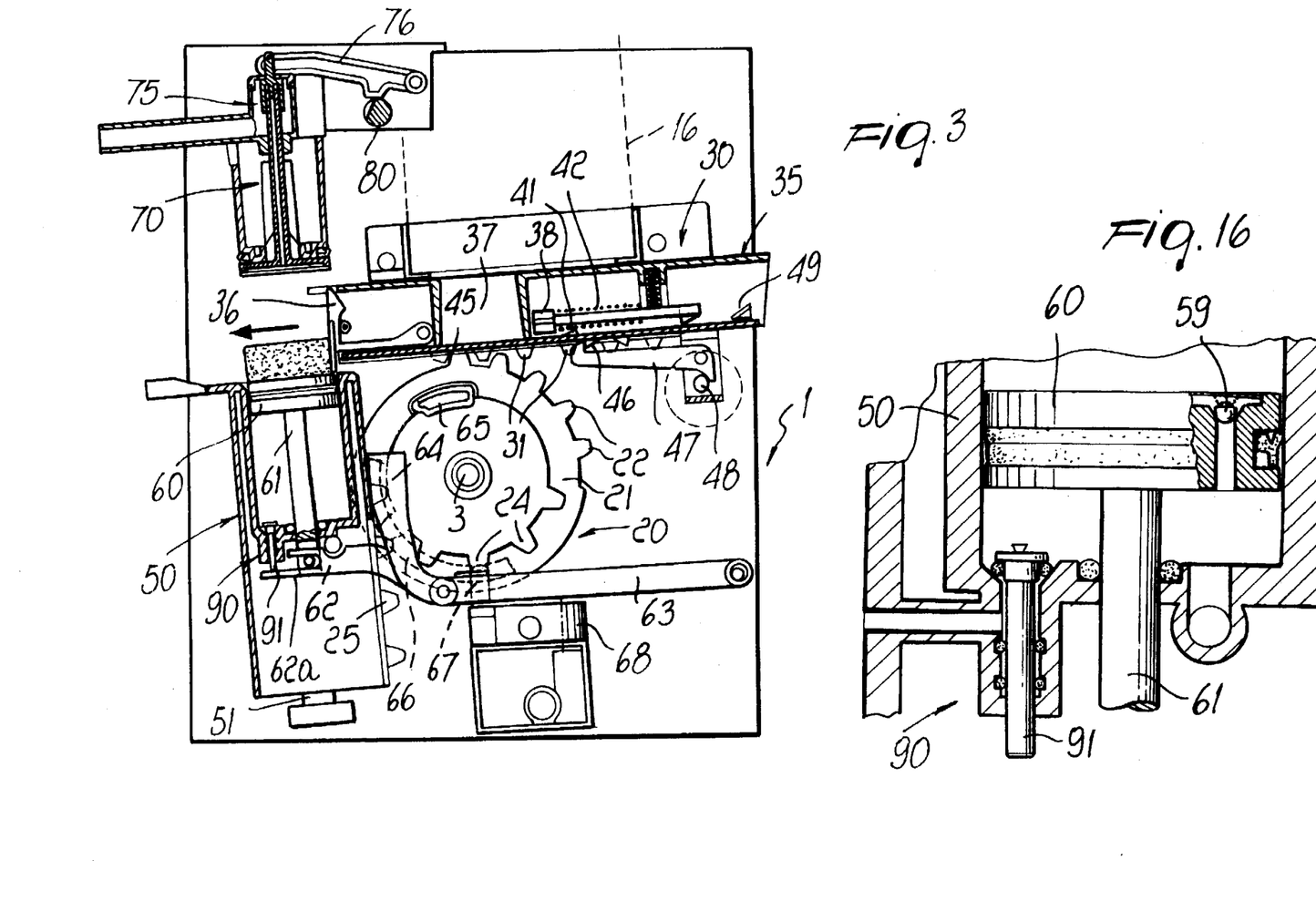
FIG. 3 is a lateral elevation view of the machine during dregs expulsion.
FIG. 16 is an enlarged-scale view of the detail of the lower portion of the infusion chamber, illustrating the venting valve.
Figure 4:
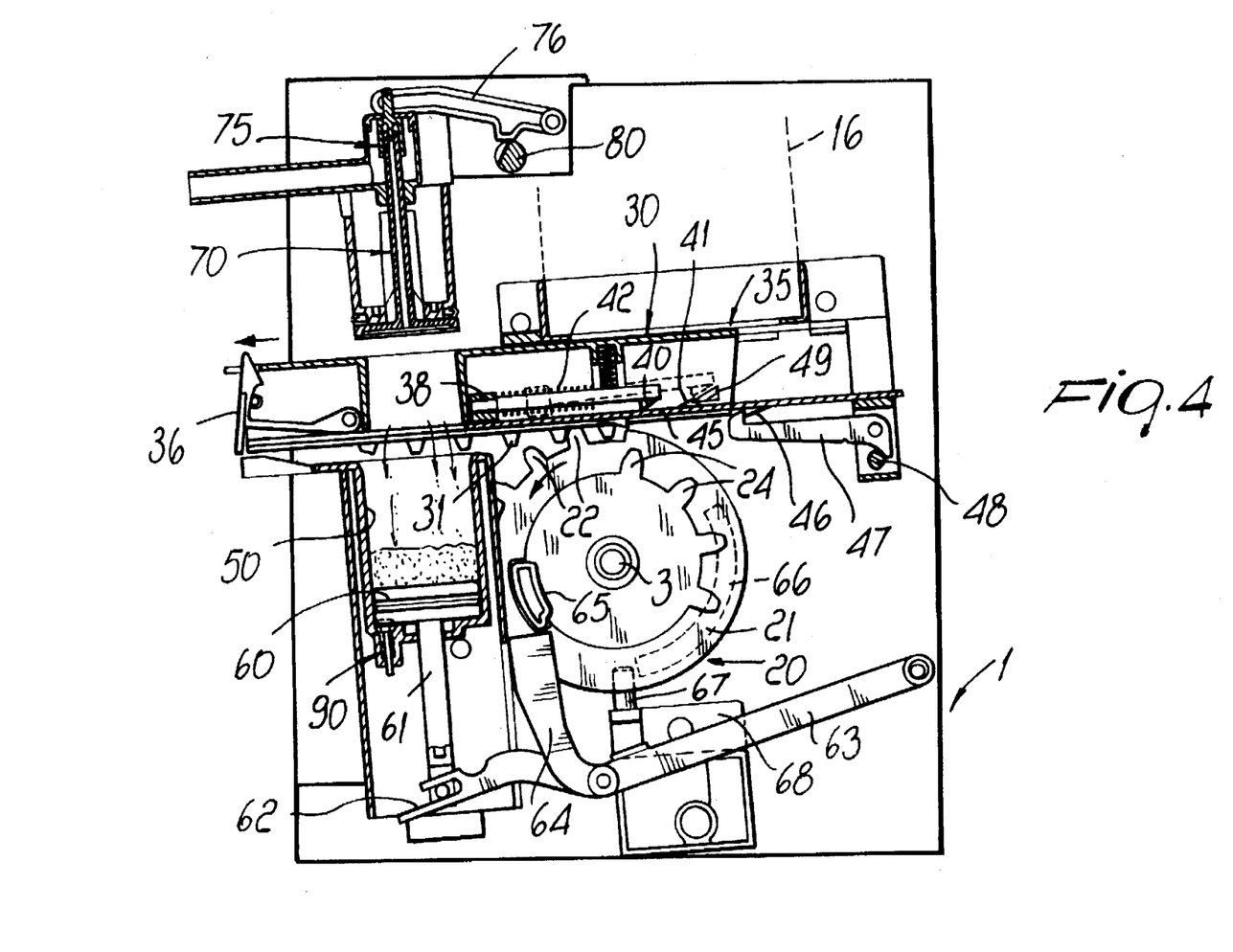
FIG. 4 is a partially sectional lateral elevation view of the machine during the introduction of the ground coffee in the extraction chamber.

When the extraction chamber is at its lowest point, shown in FIG. 3, the infusion plunger, which is kept in the raised position for engagement below the actuation lever 63 of the secondary lever 68 that limits the translatory motion of said lever, moves the pellet of dregs so that it lies above the extraction chamber, which is instead shifted downwards by engagement between the sets of teeth 24 and 25.

By continuing the rotation of the lever 10, the set of teeth 22 and the toothed portion 31 engage one another, with the consequent translatory motion of the body 35 of the feeding and expulsion unit causing an initial expulsion of the dregs.

As the rotation of the lever continues, the translatory motion of the unit 35 also continues, said unit being arranged below the dosage device and receiving the desired amount of coffee.

The subsequent rotation causes the cam 65 to engage the portion 64 of the lever and causes the pin 66 in practice to disengage the secondary lever 68 below the lever 63, allowing further downward translatory motion thanks to the engagement of the cam 65 with the end 64, and the infusion plunger moves into the lower part of the extraction chamber.

The further translatory motion of the unit 30 causes the gate to be engaged by the pawl 47, consequently opening it and preparing the ground coffee in the extraction chamber.

If one does not wish to prepare the ground coffee, it is sufficient to act on the secondary shaft 48, which does not allow to open the gate by turning the gate pawl 47.

After the ground coffee has been prepared in the extraction chamber, the rotation of the lever 10 is reversed, consequently causing the return of the unit 30 and the subsequent rise of the extraction chamber, which couples to the complementary plunger, performing stable securing by means of the locking lever 95.

In these conditions, the machine is ready for dispensing the coffee; dispensing occurs by actuating the pump for delivering hot water, which is fed below the infusion plunger at a pressure that overcomes the calibrated valve 59 provided in said infusion plunger; therefore, the water is delivered, passes at a preset pressure through the ground coffee, and is then dispensed externally by means of the dispensing duct 71, into which the coffee extract is fed after passing through the counterpressure valve, which controls the delivery duct on the complementary plunger 70.

Coffee dispensing is interrupted by turning the knob 81 into the position that selects stopping; the knob acts on the secondary shaft 80 which, by means of a cannula provided thereon, opens the discharge valve of the duct that feeds water below the infusion plunger, discharging the residual pressure.

From the above description it is thus evident that the invention achieves the intended aim and objects, and in particular the fact is stressed that a coffee dispensing machine is provided the operation whereof is achieved through mechanical couplings that constitute a great constructive simplification and allow to perform the automatic sequence of movements.

Furthermore, the particular embodiment used, which allows to reduce friction during movement, allows to use manual actuation with reduced actuation efforts.

The invention thus conceived is susceptible of numerous modifications and variations, all of which are within the scope of the inventive concept.

Furthermore, all the details may be replaced with other technically equivalent elements.

In practice, the materials employed, as well as the contingent shapes and dimensions, may be any according to the requirements.

What is claimed is:

1. A machine for making beverages such as espresso coffee, with automatic ground coffee introduction and dregs expulsion, comprising:

a ground coffee dosage device;

a cam-based actuation unit;

a main shaft that drives said ground coffee dosage device and said cam-based actuation unit;

a ground coffee feeding-and-dregs-expulsion unit interacting with said cam-based actuation unit;

a block forming a movable extraction chamber interacting with said cam-based actuation unit;

said dosage device delivering ground coffee into said coffee feeding-and-dregs-expulsion unit, said coffee feeding-and-dregs-expulsion unit delivering said ground coffee into said extraction chamber;

an infusion plunger having an axis;

an actuation lever for said infusion plunger, interacting with said cam-based unit and directly connected to the infusion plunger, said infusion plunger slidable along said axis inside said movable extraction chamber, a hot water inlet located below said infusion plunger for delivering hot water into said extraction chamber; and a fixed complementary plunger provided above said extraction chamber for compacting the ground coffee fed into said extraction chamber, said infusion plunger slidable axially with respect to said complementary plunger and said ground coffee feeding and dregs expulsion unit slidable transversely with respect to the axis of said infusion plunger.

2. A machine according to claim 1, further comprising a unit for the actuation of said main shaft comprising an actuation crank; a first gear; and a second gear, said actuation crank mechanically associated with said first gear that meshes with said second gear which is keyed on said main shaft.

3. A machine according to claim 2, wherein said unit for the actuation of said main shaft comprises an electric motor.

4. A machine according to claim 1, wherein said cam-based actuation unit comprises: a substantially circular plate-like element having a toothed portion for the actuation of said ground coffee feeding-and-dregs-expulsion unit; a sector that is laterally adjacent to said plate-like element and is provided with a set of teeth for the translatory motion of said extraction chamber; and a cam for interaction with said actuation lever for the infusion plunger.

5. A machine according to claim 1, wherein said ground coffee feeding-and-dregs-expulsion unit comprises an elongated body that ends with a pusher adapted to expel used coffee, said elongated body forming a coffee introduction chamber that can be arranged below said ground coffee dosage device and is controlled by a sliding gate.

6. A machine according to claim 5, comprising a pawl; and wherein said sliding gate has a tooth that can couple to said pawl which is detachably arrangable in a position for engagement with said tooth to produce the opening sliding of said gate when said elongated body slides.

7. A machine according to claim 5, further comprising:

an abutment; a hammer located laterally of said coffee introduction chamber and provided with a stem and a spring arranged to urge said stem; said hammer slidable, so as to produce an impact against said coffee introduction chamber to facilitate the complete exit of the ground coffee, said stem ending with a tooth that can engage said abutment that is adapted to produce an elastic charging of said spring, and a release element being furthermore provided which can engage said stem to disengage said tooth from said abutment and produce the impact against said coffee introduction chamber.

8. A machine according to claim 4, comprising a pair of columns; and wherein said extraction chamber is slidingly guided on said pair of columns and is provided with a rack-like set of teeth that engages said toothed sector of said cam-based unit.

9. A machine according to claim 1, wherein said cam-based unit includes a rotating cam; and wherein said infusion plunger is slidable hermetically in said extraction chamber and has a stem which protrudes downwards from said extraction chamber; said actuation lever for the infusion plunger having a fork-like end, and said stem engages said fork-like end of said actuation lever for the infusion plunger, said actuation lever provided with a folded end that can engage said cam of said cam-based unit for the retraction of the infusion plunger.

10. A machine according to claim 4, further comprising a secondary lever having an actuation pin; and said cam-based unit comprises, on the face of said plate-like element that is opposite to the face bearing said sector, a sector-shaped cam that can engage said actuation pin of said secondary lever, said secondary lever arrangable by movement of said actuation pin below the actuation lever of said infusion plunger to prevent the movement thereof when the plunger is in raised position.

11. A machine according to claim 1, further comprising a duct for dispensing the coffee extract, said duct being provided inside said complementary plunger; a dispensing counterpressure valve having a pin-shaped body; a dispensing lever; and a rod-shaped spring; said duct being controlled by said dispensing valve which is in turn controlled by said dispensing lever acting on said rod-shaped spring that presses on said pin-shaped body of said dispensing valve.

12. A machine according to claim 11, further comprising gaskets having an extremely low sliding friction and high resistance to clogging and being provided, respectively, on said infusion plunger and on said complementary plunger.

13. A machine according to claim 11, further comprising: a first cam; a first lever; a spring element; a second cam; a first switch; a faucet; a third cam; a second switch; and a secondary shaft adapted for the synchronized engagement of said-counterpressure valve with a feed of a pump by means of said first cam acting on said first lever that actuates said spring element so as to release said spring element and by means of said second cam acting on said second switch, said secondary shaft opening said faucet for drawing hot water, said secondary shaft, rotated into another position, synchronizing the engagement of a resistor of a boiler and the opening of said faucet by means of said third cam acting on said second switch to produce steam.

14. A machine according to claim 9, wherein said fork-like end of the actuation lever includes a tab, and a venting valve is provided below said extraction chamber and is provided with a stem that interacts with said tab of said fork-like end of the actuation lever.

15. A machine according to claim 1, further comprising a calibrated valve located inside said infusion plunger that opens when a preset pressure value is reached for the hot water to be fed into the ground coffee to produce a coffee extract.

16. A machine according to claim 13, further comprising a wheel mounted on said main shaft and having a cam thereon and a locking lever that is oscillatably mounted on said extraction chamber and engages said complementary plunger, said cam acting on said locking lever to engage and disengage said complementary plunger during rotation of the wheel.

17. A machine for making a coffee beverage, comprising:
a housing;
an actuation unit within said housing and having a rotary member;
a ground coffee dosage device supported by said housing and including an inlet for receiving ground coffee and a mechanism for dispensing a preselected amount of ground coffee;
a ground coffee feeding unit guided for substantially horizontal sliding within said housing and having a ground coffee introduction chamber with an open top arrangably beneath said dosage device for receiving ground coffee, and a bottom, closed by an openable door, said ground coffee feeding unit driven in sliding movement by a mechanical connection to said rotary member;
a movable extraction chamber guided for substantially vertical movement within said housing;

an infusion plunger guided for substantially vertical sliding movement within said extraction chamber, said infusion plunger driven by a mechanical connection to said rotary member, said infusion plunger having an openable valve to admit hot water from below said infusion plunger into said extraction chamber; and a fixed complementary plunger mounted within said housing above said extraction chamber in opposition to said infusion plunger for compacting the ground coffee within said extraction chamber.

18. The machine according to claim 17, wherein said ground coffee feeding unit further comprises a dreg expulsion mechanism having a pusher for displacing used ground coffee off of said infusion plunger during sliding movement of said ground coffee feeding unit.

19. The machine according to claim 17 further comprising a main shaft driving said rotary member, and wherein said rotary member includes a substantially circular plate having a toothed portion; and said ground coffee feeding unit includes a plurality of spaced-apart teeth which interengage with said toothed portion to drive said feeding unit in sliding movement on rotary movement of said rotary member.

20. The machine according to claim 19, wherein said extraction chamber includes a rack of teeth, and said rotary element member includes a sector that includes a set of teeth which engage said rack of said teeth to drive said extraction chamber in sliding movement upon rotary movement of said rotary member.

21. The machine according to claim 17, comprising an actuation lever for mechanically connecting said infusion plunger and said rotary member, and said rotary member includes a cam for interaction with said actuation lever for driving said infusion plunger in sliding movement upon rotary movement of said rotary member.

22. The machine according to claim 17, comprising a pawl stationary within said housing, and wherein said openable door is slidingly openable and said openable door includes a tooth that can be engaged by said pawl during sliding of said ground coffee feeding unit to slide open said door.

23. The machine according to claim 17, further comprising:

a stationary abutment;

a hammer located laterally of said coffee chamber and provided with a stem and a surrounding spring, and said stem slidable so as to cause an impact against said coffee introduction chamber to facilitate a complete exit of the ground coffee from said introduction chamber, said spring held to said ground coffee feeding unit on one end and to said stem at a respective other end thereof, said stem ending with a tooth that can engage said abutment to hold said stem stationary while said ground coffee feeding unit slides to produce an elastic charging of said spring, and a release element engagable with said tooth of said stem to disengage said tooth from said abutment to release said stem and to produce the impact against said coffee introduction chamber by the elastic discharging of said spring.

24. The machine according to calim 17, wherein said rotating member comprises a rotating cam; and wherein said infusion plunger is slidable hermetically in said extraction chamber and has a stem which protrudes downwardly from said extraction chamber;

and comprising an actuation lever for mechanically connecting said infusion plunger to said rotating cam, said actuation lever having a fork-shaped end, and said stem engages said fork-shaped end of said actuation lever for said infusion plunger, which is provided with an engagement portion that can engage said cam of said actuation unit for the retraction of said infusion plunger.

* * * * *

UNITED STATES PATENT AND TRADEMARK OFFICE
CERTIFICATE OF CORRECTION

PATENT NO.: 5,722,313
DATED : March 3, 1998
INVENTOR(S): Schmed

It is hereby certified that error appear(s) in the above-identified patent and that said Letters Patent are hereby corrected as shown below:

Column 4, line 3, please delete "body as" and insert –body 35, as–

Column 10, line 23, please delete "to calim 17," and insert –to claim 17,--

Signed and Sealed this

Eighth Day of May, 2001

Attest:

NICHOLAS P. GODICI

Attesting Officer

Acting Director of the United States Patent and Trademark Office